(12) United States Patent  
Iguchi (10) Patent No.: US 10,042,148 B2  
(45) Date of Patent: Aug. 7, 2018

(54) LIGHT SHEET MICROSCOPE AND SHEET ILLUMINATION METHOD

(71) Applicant: OLYMPUS CORPORATION, Hachioji-shi, Tokyo (JP)

(72) Inventor: Yoshihito Iguchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/348,642

(22) Filed: Nov. 10, 2016

(65) Prior Publication Data

US 2017/0139193 A1     May 18, 2017

(30) Foreign Application Priority Data

Nov. 17, 2015  (JP) ................. 2015-224842

(51) Int. Cl.
  *G02B 21/00*  (2006.01)
  *G02B 5/00*   (2006.01)
  *G02B 15/00*  (2006.01)

(52) U.S. Cl.
  CPC ........... *G02B 21/006* (2013.01); *G02B 5/005* (2013.01); *G02B 15/00* (2013.01); *G02B 21/0032* (2013.01)

(58) Field of Classification Search
  CPC ...... G02B 21/006; G02B 5/005; G02B 15/00; G02B 21/0032
  USPC ........................................ 359/385, 386, 388
  See application file for complete search history.

(56) References Cited

U.S. PATENT DOCUMENTS

| | | | |
|---|---|---|---|
| 7,787,179 B2 | 8/2010 | Lippert et al. | |
| 2015/0253560 A1* | 9/2015 | Otte | G02B 21/0032 359/385 |
| 2016/0124201 A1* | 5/2016 | Kikuchi | G02B 21/0048 359/385 |
| 2016/0305883 A1* | 10/2016 | Betzig | G02B 21/16 |
| 2016/0306154 A1* | 10/2016 | Iguchi | G02B 21/06 |

FOREIGN PATENT DOCUMENTS

JP     2008250303 A     10/2008

* cited by examiner

*Primary Examiner* — Frank Font  
(74) *Attorney, Agent, or Firm* — Holtz, Holtz & Volek PC (57) ABSTRACT

A light sheet microscope includes an illumination optical system that irradiates a light sheet onto a sample and a setting changer that changes a setting of a divergence angle or convergence angle relating to a width direction of the light sheet emitted from the illumination optical system.

16 Claims, 11 Drawing Sheets

LIGHT SHEET MICROSCOPE AND SHEET ILLUMINATION METHOD

CROSS-REFERENCE TO RELATED APPLICATIONS

This application is based upon and claims the benefit of priority from prior Japanese Patent Application No. 2015-224842, filed on Nov. 17, 2015, the entire contents of which are incorporated herein by this reference.

BACKGROUND OF THE INVENTION

Field of the Invention

The present invention relates to technology of a light sheet microscope and a sheet illumination method.

Description of the Related Art

In a field of fluorescence microscopes, technology is known in which laser light is irradiated onto a sample from a direction perpendicular to an optical axis of a detection optical system and a light sheet perpendicular to the optical axis of the detection optical system is formed in the sample. This technology has the merits of enabling a damage inflicted on samples to be suppressed, a high longitudinal resolution to be realized, and the like, and it has gathered attention recently.

In the above-described technology, the sample is illuminated from a direction different from the optical axis direction of the detection optical system. Therefore, when a portion to which light is hard to transmit owing to absorption or a portion in which light is diffused is contained in the sample, light is not incident behind the relevant portion and a band of shadow is formed in a field of view.

Related technology is described in, for example, Japanese Laid-open Patent Publication No. 2008-250303. In Japanese Laid-open Patent Publication No. 2008-250303, the technology is described in which a radiation component of a sheet light is irradiated onto specimen substances at different angles according to the time due to vibrational motions of a wobble plate or a swing mirror.

SUMMARY OF THE INVENTION

According to one aspect of the present invention, a light sheet microscope is provided including an illumination optical system that irradiates a light sheet onto a sample from a direction substantially perpendicular to an optical axis of a detection optical system and a setting changer that changes a setting of a divergence angle or convergence angle relating to a width direction of the light sheet emitted from the illumination optical system.

According to another aspect of the present invention, a sheet illumination method for illuminating a sample by a light sheet is provided including changing setting of a divergence angle or convergence angle relating to a width direction of the light sheet and irradiating the light sheet onto the sample from a direction substantially perpendicular to an optical axis of a detection optical system.

BRIEF DESCRIPTION OF THE DRAWINGS

The present invention will be more apparent from the following detailed description when the accompanying drawings are referenced.

FIGS. 1A and 1B illustrate a configuration of a light sheet microscope 1 according to a first embodiment. In FIG. 1A, a ray diagram relating to the width direction of a light sheet is depicted along with the configuration of the light sheet microscope 1. In FIG. 1B, a ray diagram relating to the thickness direction of the light sheet is depicted along with the configuration of the light sheet microscope 1.

DESCRIPTION OF THE EMBODIMENTS

In the technology described in Japanese Laid-open Patent Publication No. 2008-250303, also in an area to which light is not irradiated by a radiation component at one angle due to being obstructed by a portion through which light does not pass, light can be irradiated by the radiation component at another angle. Therefore, the area to which light is not irradiated can be made small and a band of shadow is less likely to occur. However, because an irradiation angle changes, it is difficult to evenly illuminate an area in an illumination range. Therefore, new technology is requested in which the band of shadow is suppressed from being formed in a light sheet microscope that forms a light sheet.

Based on the above, embodiments of the present invention will be described in detail below.

<First Embodiment>

Figure 1A:
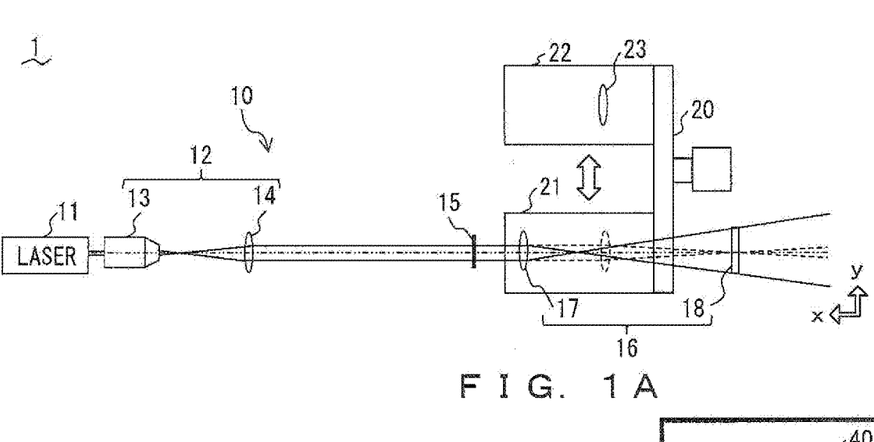
Figure 1B:
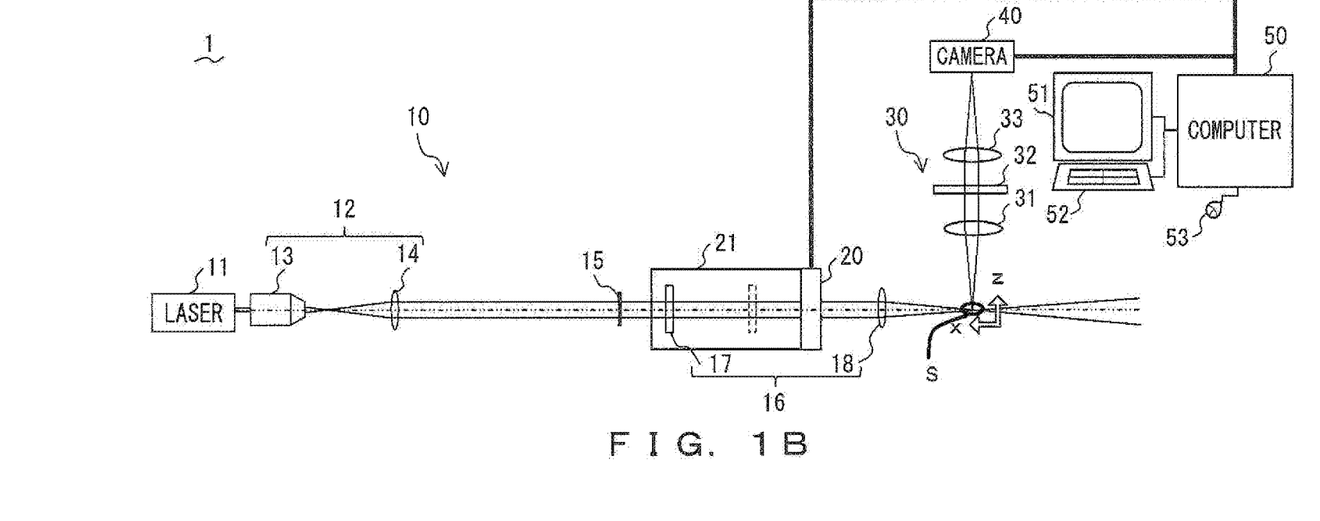

FIGS. 1A and 1B illustrate a configuration of a light sheet microscope 1 according to the present embodiment. In FIG. 1A, a ray diagram relating to a width direction of a light sheet is depicted along with the configuration of the light sheet microscope 1. In FIG. 1B, a ray diagram relating to a thickness direction of the light sheet is depicted along with the configuration of the light sheet microscope 1. An x, y, and z coordination system illustrated in FIGS. 1A and 1B is a rectangular coordinate system defined for the sake of convenience of direction reference in the specification.

The light sheet microscope 1 is a fluorescence microscope that detects fluorescence from samples, for example, a biological specimen etc. The light sheet microscope 1 includes an illumination optical system 10, a setting change mechanism 20, a detection optical system 30, a camera 40, a computer 50, a monitor 51, and an input device (a keyboard 52 and a mouse 53). The samples (e.g., sample S) are located in the vicinity of a position at which an optical axis of the illumination optical system 10 intersects that of the detection optical system 30.

The illumination optical system 10 forms a light sheet having a sheet shape that is substantially perpendicular to an optical axis of the detection optical system 30, and is configured so that the light sheet is irradiated onto the sample S from the direction substantially perpendicular to the optical axis of the detection optical system 30. Details of the illumination optical system 10 will be described below. Here, the light sheet is illumination light that forms an illumination area having the sheet shape. The sheet shape refers to a shape such that a cross section (hereinafter, described as a light flux section) that is perpendicular to a traveling direction (the optical axis direction on the emission side of the illumination optical system 10, namely, the x direction) of light has a two-dimensional shape in which one of two lengths perpendicular to each other is long and the other of the two lengths is short. After that, a direction in which a length is long within a light flux section is described as the width direction of the light sheet and a direction in which a length is short within the light flux section is described as the thickness direction of the light sheet. Further, the sheet shape that is substantially perpendicular to the optical axis of the detection optical system 30 refers to a sheet shape such that the light sheet plane defined by a traveling direction and a width direction is substantially perpendicular to the optical axis of the detection optical system 30. In the present embodiment, the traveling direction is the x-axis direction, the width direction is the y-axis direction, and the thickness direction is the z-axis direction. On this point, a second embodiment and later are the same as the first embodiment. In the illumination optical system 10, the light sheet divergent in the width direction is formed as illustrated in FIG. 1A.

The setting change mechanism 20 is a setting changer of a divergence angle relating to the width direction of the light sheet emitted from the illumination optical system 10. Details of the setting change mechanism 20 will be described below. Here, the divergence angle is a maximum angle formed by the optical axis on the emission side of the illumination optical system 10 and beam components of the light sheet emitted from the illumination optical system 10. When combined with a scanner 15 to be hereinafter described, as the divergence angle becomes greater, light can come around behind a shading portion and sneak into an area closer to the shading portion, thereby suppressing the band of shadow. Note that energy per unit area irradiated onto the illumination area is reduced. In addition, a scanning width necessary for realizing even illumination is also widened. Therefore, the divergence angle is preferably an angle that is as small as possible, with the band of shadow sufficiently suppressed. It varies in response to the sample whether the band of shadow is easily generated, and therefore an angle also varies in response to the sample, in which the band of shadow is sufficiently suppressed.

In the setting change mechanism 20, setting of the divergence angle can be changed in response to the sample. For this reason, the band of shadow can be suppressed while suppressing an excessive reduction in illumination energy.

The detection optical system 30 is an optical system in which light (e.g., fluorescence) from the sample is condensed and an optical image of the sample is formed on a light-receiving surface of the camera 40. The detection optical system 30 includes an objective lens 31, a wavelength selection element 32, and a tube lens 33 in the order from the sample side. The wavelength selection element 32 is, for example, a barrier filter for preventing illumination light from being incident on the camera 40.

The camera 40 is an imaging device having a two-dimensional image sensor such as a CCD, a CMOS, or the like and detects light that is incident through the detection optical system 30 to image the sample. The computer 50 is a control device that controls the light sheet microscope 1, and is, for example, a standard computer having a processor and a memory. In the computer 50, for example, control of an exposure time of the camera 40, display control of the monitor 51, and the like are performed. In addition, the computer 50 may control the setting change mechanism 20. The monitor 51 displays images of the sample acquired by the camera 40. The keyboard 52 and the mouse 53 are connected to the computer 50, and are an input device that inputs to the computer 50 instructions from a user of the light sheet microscope 1.

The illumination optical system 10 includes a laser 11. The laser 11 is a light source that emits laser light that is to be converted to the light sheet. The illumination optical system 10 further includes a first optical system 12, a scanner 15, and a scanning optical system 16 in the order from the laser 11 side. The first optical system 12 is arranged between the laser 11 and the scanner 15, and is an optical system that irradiates laser light onto the scanner 15. The first optical system 12 includes a lens 13 and a lens 14, and is configured so as to adjust a beam diameter of the laser light. The scanner 15 is a scanner that scans, in the width direction of the light sheet, the sample using the light sheet. The scanner 15 is a rotatable mirror having a deflection plane that deflects light, for example, a galvanometer mirror, a resonant mirror, or the like. In FIGS. 1A and 1B, for ease of drawing, optical elements on an optical path of light deflected by the scanner 15 are arranged in a straight line.

The scanning optical system 16 includes a cylindrical lens 17 and a cylindrical lens 18, and irradiates onto the sample the light deflected by the scanner 15. As illustrated in FIGS. 1A and 1B, the cylindrical lens 17 is arranged so as to have a refractive power in the xy-plane and so as not to have a refractive power in the xz-plane. The cylindrical lens 18 is arranged so as to have the refractive power in the xz-plane and so as not to have the refractive power in the xy-plane. That is, the cylindrical lens 17 and the cylindrical lens 18 are arranged so that the plane in which the cylindrical lens 17 has the refractive power and the plane in which the cylindrical lens 18 has the refractive power are perpendicular to each other. The scanning optical system 16 is arranged so that the scanner 15 is positioned at a front side focal point position in the light sheet plane (xy-plane) of the scanning optical system 16. That is, the cylindrical lens 17 is arranged so that the scanner 15 is positioned at the front side focal point position of the cylindrical lens 17. The front side focal point position of the cylindrical lens 17 is a position at which light is linearly condensed when parallel light flux is incident on the cylindrical lens 17 from the sample side.

In the illumination optical system 10, after a light flux diameter (beam diameter) is adjusted by the first optical system 12, the laser light emitted from the laser 11 is incident on the scanner 15 in a state of nearly parallel light flux. The laser light deflected by the scanner 15 is incident on the cylindrical lens 17 and the cylindrical lens 18. As illustrated in FIGS. 1A and 1B, the cylindrical lens 17 converges the laser light in the xy-plane, and on the other hand, maintains the light flux diameter of the laser light without substantially acting on the laser light in the xz-plane. As illustrated in FIGS. 1A and 1B, the cylindrical lens 18 further converges the laser light in the xz-plane, and on the other hand, maintains the divergence angle without substantially acting on the laser light in the xy-plane. The cylindrical lens 18 is arranged so that a rear side focal point position of the cylindrical lens 18 is positioned approximately on the optical axis of the detection optical system 30. As a result, the light sheet having the divergence angle in the width direction is formed within an observation area (field of view) of the light sheet microscope 1. Here, an example of the light flux that is incident on the scanner 15 is the nearly parallel light flux, but may not necessarily be the nearly parallel light flux.

The setting change mechanism 20 is a lens exchanger, and specifically is a rolling mechanism that exchanges a lens unit 21 including the cylindrical lens 17 for a lens unit 22 including a cylindrical lens 23. The cylindrical lens 23 is a cylindrical lens having a focal length different from that of the cylindrical lens 17. The cylindrical lens 23 is provided in the lens unit 22 so that the scanner 15 is positioned at a front side focal point position of the cylindrical lens 23 when the lens unit 22 is arranged on the optical path.

The setting change mechanism 20 switches the lens unit arranged on the optical path from the lens unit 21 to the lens unit 22. As a result, the setting change mechanism 20 exchanges the cylindrical lens 17 for the cylindrical lens 23 and arranges the cylindrical lens 23 so that the scanner 15 is positioned at the front side focal point position of the cylindrical lens 23. This process permits the focal length of the scanning optical system 16 to be changed. When the cylindrical lens 23 is arranged on the optical path, the scanning optical system 16 is composed of the cylindrical lens 23 and the cylindrical lens 18.

The setting change mechanism 20 exchanges the lens unit and changes the focal length of the scanning optical system 16, and thereby an angle relating to the width direction of the light sheet toward the sample from the illumination optical system 10 is changed. In FIG. 1A, the light flux is depicted by a solid line at the time when the lens unit 21 is arranged on the optical path, and the light flux is depicted by a broken line at the time when the lens unit 22 is arranged on the optical path. Regarding a point in which the focal length is changed to thereby change an angle of the light sheet, descriptions will be made with reference to FIG. 2.

Figure 2:
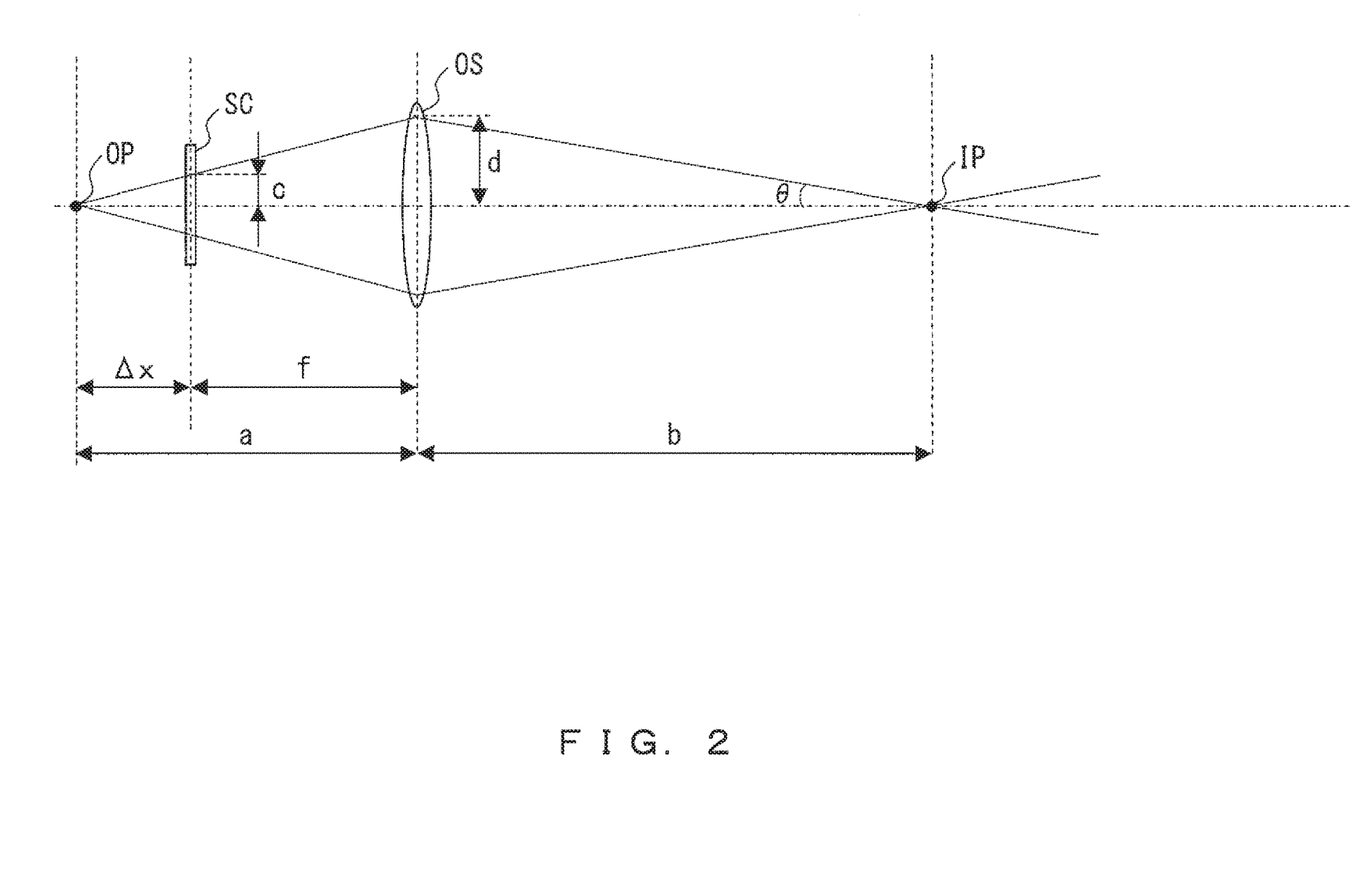
FIG. 2 illustrates a state in which an object point OP is projected onto an image point IP through an optical system OS.

FIG. 2 is a view showing an object point OP projected onto an image point IP through an optical system OS, and an example is illustrated in which a scanner SC is arranged at a front side focal point position of the optical system OS. When a distance from the optical system OS having a focal length f to the object point OP is set to a and a distance from the optical system OS to the image point IP is set to b, the following formula of a lens holds.

$$\frac{1}{a} + \frac{1}{b} = \frac{1}{f} \quad (1)$$

When a distance from the scanner SC to the object point OP is set to $\Delta x$, a distance b is expressed using the following expression.

$$b = \frac{fa}{a-f} \quad (2)$$
$$= \frac{f(f + \Delta x)}{\Delta x}$$

When a radius of light flux in the scanner SC is set to c, a radius d of light flux in the optical system OS is expressed using the following expression.

$$d = \frac{c}{\Delta x} \times (\Delta x + f) \quad (3)$$
$$= \frac{c(\Delta x + f)}{\Delta x}$$

An angle $\theta$ of the light flux emitted from the optical system OS is derived from expressions (2) and (3), as in the following expression. Expression (4) expresses that the angle $\theta$ of the light flux depends on the focal length f of the optical system OS and the radius c of the light flux in the front side focal point position of the optical system OS.

$$\theta = \tan^{-1}\left(\frac{d}{b}\right) \quad (4)$$
$$= \tan^{-1}\left(\frac{c}{f}\right)$$

In the light sheet microscope 1, the scanning optical system 16 corresponds to the optical system OS illustrated in FIG. 2. Therefore, the focal length f of the scanning optical system 16 is changed, thereby changing an angle relating to the width direction of the light sheet.

Figure 3:
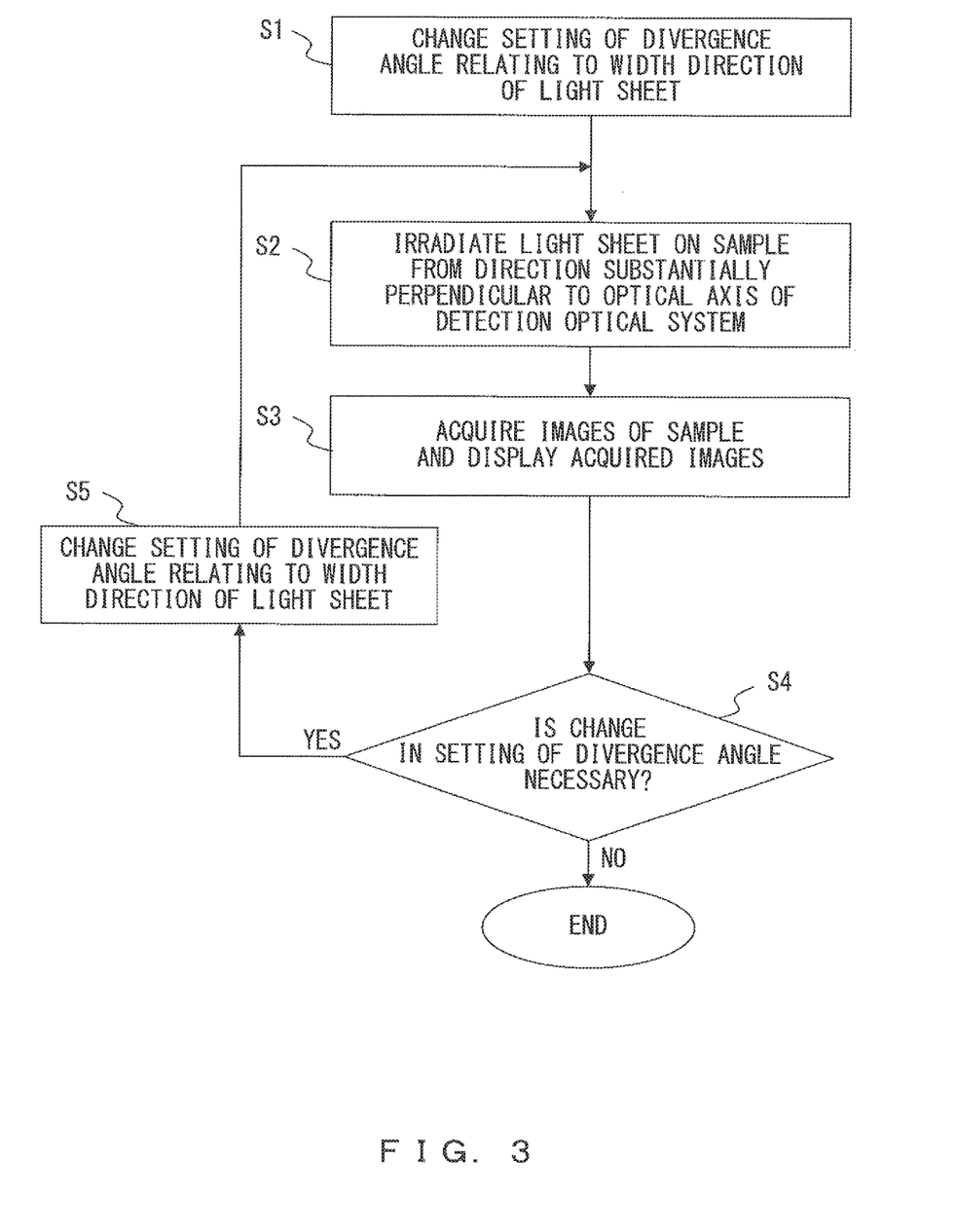
FIG. 3 is a flowchart illustrating a procedure of a sheet illumination method performed using the light sheet microscope 1.

FIG. 3 is a flowchart illustrating a procedure of the sheet illumination method performed using the light sheet microscope 1. The setting change mechanism 20 changes a setting of the divergence angle relating to the width direction of the light sheet (step S1). Here, the user operates the setting change mechanism 20 and thereby the setting change mechanism 20 may switch the lens unit arranged on the optical path. The user instructs that the lens unit be switched using the input device and the computer 50 controls the setting change mechanism 20 in accordance with the instructions of the user, and thereby the setting change mechanism 20 may switch the lens unit arranged on the optical path. When there are multiple lens units, the user may specify the divergence angle and the computer 50 may control the setting change mechanism 20 so that the lens unit for realizing the specified divergence angle is arranged on the optical path.

Next, the illumination optical system 10 irradiates the light sheet onto the sample from the direction substantially perpendicular to the optical axis of the detection optical system 30 (step S2). Specifically, the computer 50 controls the laser 11, and the illumination optical system 10 forms the light sheet by the laser light emitted from the laser 11 to irradiate the light sheet onto the sample. Afterwards, the camera 40 acquires images of the sample and the monitor 51 displays the acquired images (step S3). When the band of shadow is conspicuous, the user who views the images displayed on the monitor 51 instructs the computer 50 to change the setting of the divergence angle.

The computer 50 determines whether the change in the setting of the divergence angle is necessary, on the basis of the instruction of the user (step S4). For example, the computer 50 may determine the above on the basis of whether the setting change instruction is input to the computer 50 within a specified time. If it is determined that the setting change is necessary, the computer 50 controls the setting change mechanism 20 so that the lens unit having a greater divergence angle is arranged on the optical path (step S5). Afterwards, until it is determined that the setting change is unnecessary, the process from step S2 to step S5 is repeated. Thereby, preferable sheet illumination is realized in which the band of shadow is suppressed.

The light sheet microscope 1 can cause the light sheet divergent in the width direction to shift in parallel along the width direction using the scanner 15. Therefore, even if a portion to which light is hard to transmit or a portion in which light is diffused (the portions are collectively described as a shading portion) owing to absorption exists in the illumination area, light can sneak into an area therebehind. Accordingly, the band of shadow can be prevented from being generated in the illumination area. Further, the lens unit is switched in the setting change mechanism 20, and thereby the setting of the divergence angle of the light sheet can be changed in response to the sample. Therefore, the band of shadow can be suppressed regardless of the sample. In addition, reduction in illumination energy per unit area can be suppressed.

Further, according to the light sheet microscope 1, the scanner 15 is arranged at a front side focal point position of the scanning optical system 16, and therefore the direction of the light sheet can be kept constant during a scanning period. For this reason, the light sheet scans the sample using the scanner 15 so as to cross the entire visual field, and thereby the entire visual field can be illuminated uniformly. Further, the exposure time of the camera 40 is controlled for more than a time at which the light sheet crosses the entire visual field, thereby imaging uniformly illuminated samples and acquiring images with preferable quality.

In the present embodiment, an example is set in which two lens units are switched and used; however, three or more lens units may be switched.

<Second Embodiment>

Figure 4A:
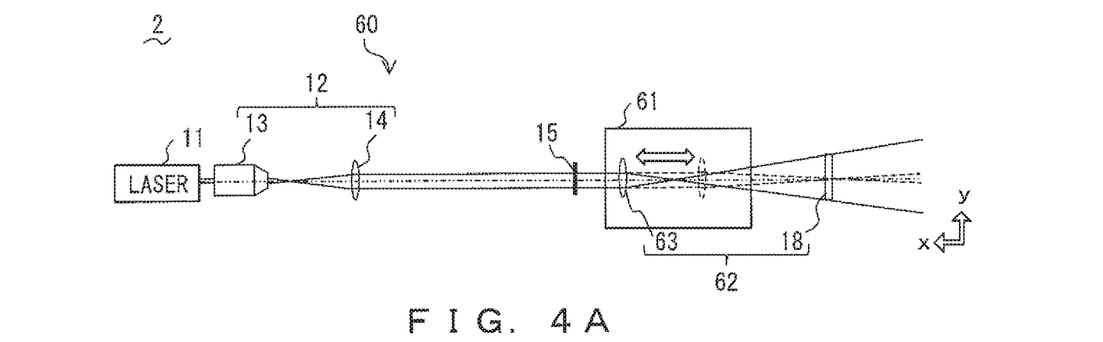
FIGS. 4A and 4B illustrate a configuration of a light sheet microscope 2 according to a second embodiment. Further, in FIG. 4A, a ray diagram relating to the width direction of the light sheet is depicted, and in FIG. 4B, a ray diagram relating to the thickness direction of the light sheet is depicted.
Figure 4B:
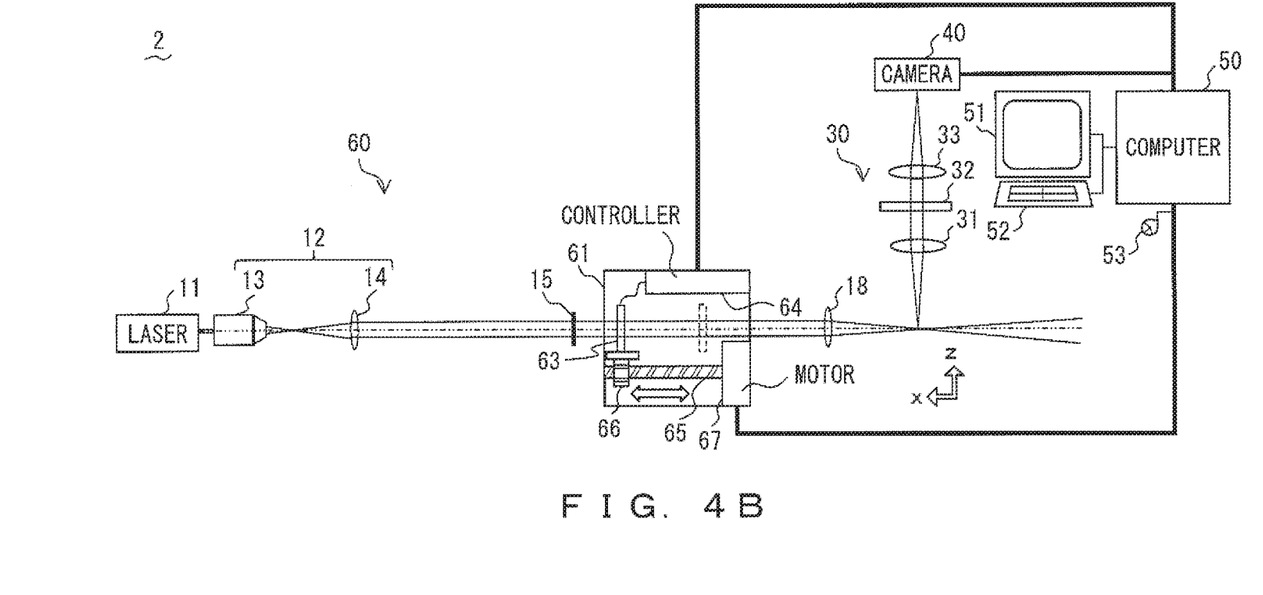

FIGS. 4A and 4B illustrate a configuration of a light sheet microscope 2 according to the present embodiment. In FIG. 4A and in FIG. 4B, a ray diagram relating to the width direction of a light sheet is depicted and a ray diagram relating to the thickness direction of the light sheet is depicted, respectively, along with the configuration of the light sheet microscope 2.

The light sheet microscope 2 differs from the light sheet microscope 1 in the configuration between the scanner 15 and the cylindrical lens 18. The other configurations thereof are the same as those of the light sheet microscope 1, and therefore detailed descriptions will be omitted. An illumination optical system 60 of the light sheet microscope 2 differs from the illumination optical system 10 of the light sheet microscope 1 in that a scanning optical system 62 is provided in place of the scanning optical system 16.

The scanning optical system 62 differs from the scanning optical system 16 in that a cylindrical lens 63 is provided in place of the cylindrical lens 17. The cylindrical lens 63, which is arranged so as to have a variable refractive power in the xy-plane and so as not to have the refractive power in the xz-plane, is a varifocal lens representative of a liquid lens. The cylindrical lens 63 is arranged closest to the scanner 15 within the scanning optical system 62. Further, the cylindrical lens 63 is arranged shiftably in the optical axis direction by the structure to be hereinafter described. The scanning optical system 62 is arranged so that the scanner 15 is positioned at the front side focal point position in the light sheet plane of the scanning optical system 62. Specifically, the cylindrical lens 63 is arranged so that the scanner 15 is positioned at a front side focal point position of the cylindrical lens 63. The arrangement of the cylindrical lens 63 is not limited to being closest to the scanner 15 in the scanning optical system 62. As long as the scanner 15 is arranged so as to be positioned at the front side focal point position in the light sheet plane of the scanning optical system 62, the cylindrical lens 63 can be arranged at an arbitrary position.

The light sheet microscope 2 includes a lens unit 61 housing the cylindrical lens 63. The lens unit 61 is a setting changer that changes the setting of the divergence angle relating to the width direction of the light sheet emitted from the illumination optical system 60. The lens unit 61 includes a controller 64 that is a focal length changer that changes a focal length of the cylindrical lens 63. The controller 64 can change the focal length of the cylindrical lens 63 at high speed. Further, the controller 64 may be controlled by the computer 50.

As the structure in which the cylindrical lens 63 is shifted in the optical axis direction, the lens unit 61 further includes a ball screw 65, a nut 66 screwed to the ball screw 65, and a motor 67 that rotates the ball screw 65. On the nut 66, the cylindrical lens 63 is fixed. Rotation of the motor 67 causes the ball screw to be rotated, and thereby the cylindrical lens 63 fixed on the nut 66 is shifted linearly in the optical axis direction of the cylindrical lens 63. The rotation of the motor 67 is controlled in accordance with the focal length of the cylindrical lens 63, and thereby the cylindrical lens 63 can be arranged so that the scanner 15 is positioned at the front side focal point position of the cylindrical lens 63, regardless of the focal length of the cylindrical lens 63. Further, the motor 67 may be controlled by the computer 50.

Also, by the light sheet microscope 2, the same advantages as those of the light sheet microscope 1 can be obtained. According to the light sheet microscope 2, a focal length of the scanning optical system 62 can be further changed at high speed by the change in the focal length of the varifocal lens. Therefore, the light sheet microscope 2 enables the setting of the divergence angle of the light sheet to be changed faster than the light sheet microscope 1.

<Third Embodiment>

Figure 5A:
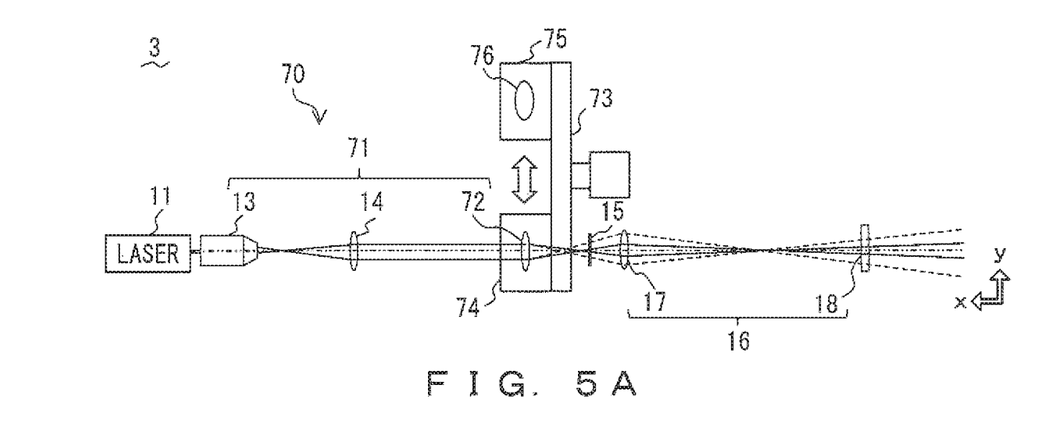
FIGS. 5A and 5B illustrate a configuration of a light sheet microscope 3 according to a third embodiment. Further, in FIG. 5A, a ray diagram relating to the width direction of the light sheet is depicted, and in FIG. 5B, a ray diagram relating to the thickness direction of the light sheet is depicted.
Figure 5B:
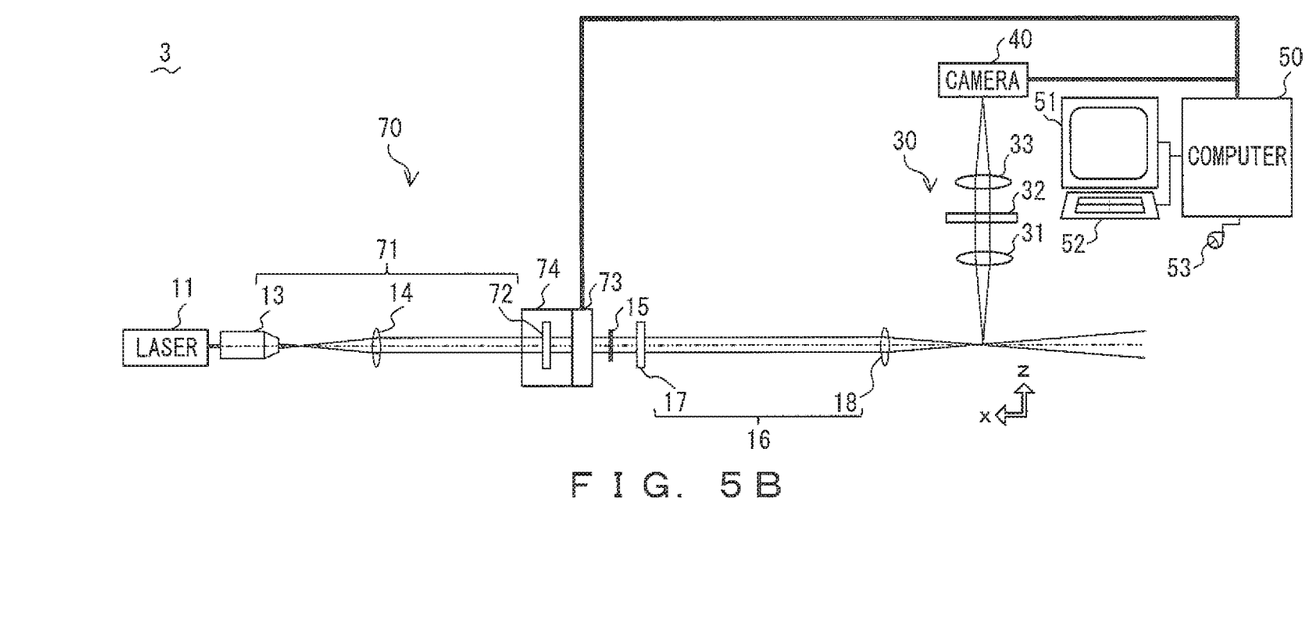

FIGS. 5A and 5B illustrate a configuration of a light sheet microscope 3 according to the present embodiment. In FIG. 5A and in FIG. 5B, a ray diagram relating to the width direction of a light sheet is depicted and a ray diagram relating to the thickness direction of the light sheet is depicted, respectively, along with the configuration of the light sheet microscope 3.

The light sheet microscope 3 differs from the light sheet microscope 1 in that an illumination optical system 70 is provided in place of the illumination optical system 10 and a setting change mechanism 73 is included in place of the setting change mechanism 20.

The illumination optical system 70 differs from the illumination optical system 10 of the light sheet microscope 1 in that a first optical system 71 is provided in place of the first optical system 12. The first optical system 71 differs from the first optical system 12 in that a cylindrical lens 72 is provided in addition to the lens 13 and the lens 14. The cylindrical lens 72 is arranged so as to have the refractive power in the xy-plane and so as not to have the refractive power in the xz-plane. Therefore, in the illumination optical system 70, the laser light that is substantially parallel light flux and the beam diameter of which is adjusted by the lens 13 and the lens 14 is converted to convergent light flux relating to the width direction using the cylindrical lens 72, and then is incident on the scanner 15.

The setting change mechanism 73 is a setting changer of the divergence angle relating to the width direction of the light sheet emitted from the illumination optical system 70. The setting change mechanism 73 differs from the setting change mechanism 20 in that a light flux diameter of light that is incident on the scanner 15 is changed and thereby the setting of an angle is changed. A point is as described above with reference to FIG. 2 and expression (4) in which the light flux diameter of light that is incident on the scanner 15 is changed and thereby the divergence angle relating to the width direction of the light sheet can be changed.

The setting change mechanism 73 is a lens exchanger, and specifically is a rolling mechanism that exchanges a lens unit 74 including the cylindrical lens 72 for a lens unit 75 including a cylindrical lens 76. The cylindrical lens 76 is a cylindrical lens having a focal length different from that of the cylindrical lens 72.

The setting change mechanism 73 switches the lens unit arranged on the optical path from the lens unit 74 to the lens unit 75, and thereby exchanges the cylindrical lens 72 for the cylindrical lens 76 so as to change a focal length of the first optical system 71. Thereby, the light flux diameter of light that is incident on the scanner 15 is changed. When the cylindrical lens 76 is arranged on the optical path, the first optical system 71 is composed of the lens 13, the lens 14, and the cylindrical lens 76.

Also by the light sheet microscope 3, the same advantages as those of the light sheet microscope 1 can be obtained.
<Fourth Embodiment>

Figure 6A:
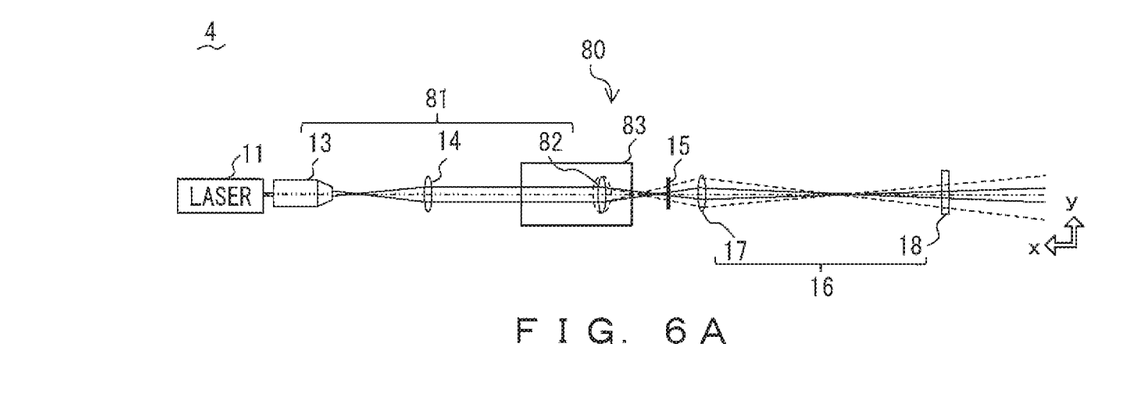
FIGS. 6A and 6B illustrate a configuration of a light sheet microscope 4 according to a fourth embodiment. Further, in FIG. 6A, a ray diagram relating to the width direction of the light sheet is depicted, and in FIG. 6B, a ray diagram relating to the thickness direction of the light sheet is depicted.
Figure 6B:
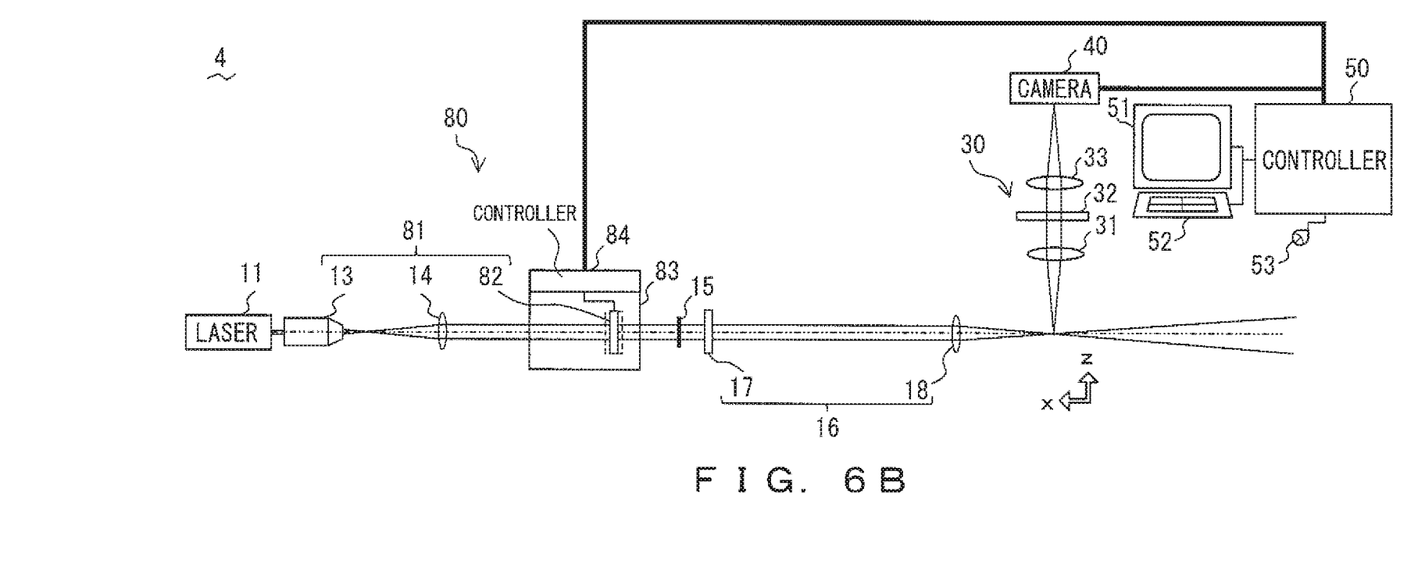

FIGS. 6A and 6B illustrate a configuration of a light sheet microscope 4 according to the present embodiment. In FIG. 6A and in FIG. 6B, a ray diagram relating to the width direction of a light sheet is depicted and a ray diagram relating to the thickness direction of the light sheet is depicted, respectively, along with the configuration of the light sheet microscope 4.

The light sheet microscope 4 differs from the light sheet microscope 3 in the configuration between the laser 11 and the scanner 15. The other configurations thereof are the same as those of the light sheet microscope 3. The illumination optical system 80 of the light sheet microscope 4 differs from the illumination optical system 70 of the light sheet microscope 3 in that a first optical system 81 is provided in place of the first optical system 71.

The first optical system 81 differs from the first optical system 71 in that a cylindrical lens 82 is provided in place of the cylindrical lens 72. The cylindrical lens 82, which is arranged so as to have the variable refractive power in the xy-plane and so as not to have the refractive power in the xz-plane, is a varifocal lens representative of the liquid lens.

The light sheet microscope 4 includes a lens unit 83 that houses the cylindrical lens 82. The lens unit 83 is a setting changer that changes the focal length of the first optical system 81 and thereby changes the setting of the divergence angle relating to the width direction of the light sheet emitted from the illumination optical system 80. The lens unit 83 includes a controller 84 that is a focal length changer that changes a focal length of the cylindrical lens 82. The controller 84 can change the focal length of the cylindrical lens 82 at high speed. Further, the controller 84 may be controlled by the computer 50.

Also by the light sheet microscope 4, the same advantages as those of the light sheet microscope 3 can be obtained. In the light sheet microscope 4, the focal length of the first optical system 81 can be further changed at high speed by the change in the focal length of the varifocal lens. Therefore, the light sheet microscope 4 enables the setting of the divergence angle of the light sheet to be changed faster than the light sheet microscope 3.
<Fifth Embodiment>

Figure 7A:
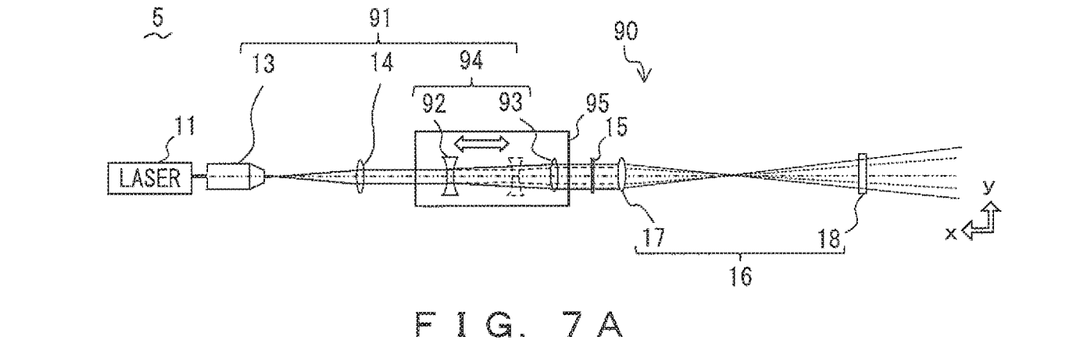
FIGS. 7A and 7B illustrate a configuration of a light sheet microscope 5 according to a fifth embodiment. Further, in FIG. 7A, a ray diagram relating to the width direction of the light sheet is depicted, and in FIG. 7B, a ray diagram relating to the thickness direction of the light sheet is depicted.
Figure 7B:
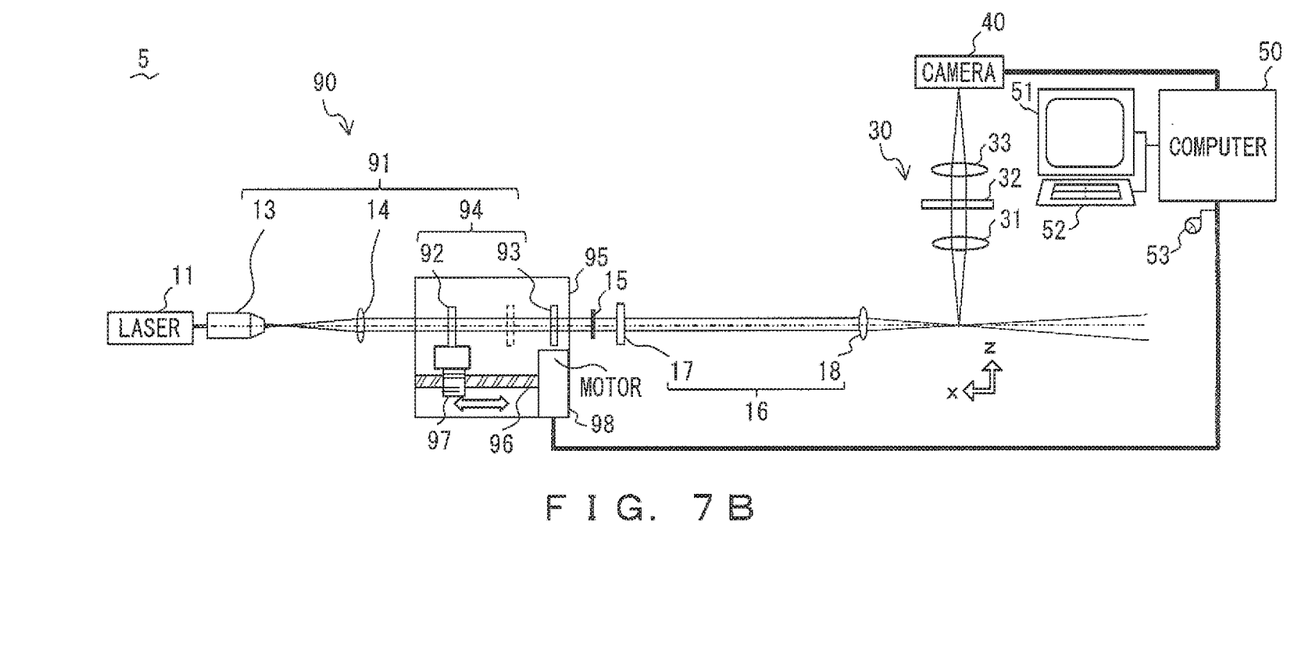

FIGS. 7A and 7B illustrate a configuration of a light sheet microscope 5 according to the present embodiment. In FIG. 7A and in FIG. 7B, a ray diagram relating to the width direction of a light sheet is depicted and a ray diagram relating to the thickness direction of the light sheet is depicted, respectively, along with the configuration of the light sheet microscope 5.

The light sheet microscope 5 differs from the light sheet microscope 3 in the configuration between the laser 11 and the scanner 15. The other configurations thereof are the same as those of the light sheet microscope 3. An illumination optical system 90 of the light sheet microscope 5 differs from the illumination optical system 70 of the light sheet microscope 3 in that a first optical system 91 is provided in place of the first optical system 71.

The first optical system 91 differs from the first optical system 71 in that a variable magnification optical system 94 is provided in place of the cylindrical lens 72. The variable magnification optical system 94 includes a cylindrical lens 92 and a cylindrical lens 93, and further adjusts the beam diameter that has been adjusted by the lens 13 and the lens 14. The cylindrical lens 92 and the cylindrical lens 93 are arranged, respectively, so as to have the refractive power in the xy-plane and so as not to have the refractive power in the xz-plane. The cylindrical lens 92 has a negative refractive power and is arranged shiftably in the optical axis direction through the structure to be hereinafter described.

The light sheet microscope 5 includes a lens unit 95 that houses the variable magnification optical system 94. The lens unit 95 is a setting changer that changes a focal length of the first optical system 91 to thereby change the setting of the divergence angle relating to the width direction of the light sheet emitted from the illumination optical system 90. As a structure in which the cylindrical lens 92 is shifted in the optical axis direction of the cylindrical lens 92 to thereby change a magnification of the variable magnification optical system 94, the lens unit 95 includes a ball screw 96, a nut 97 screwed to the ball screw 96, and a motor 98 that rotates the ball screw 96. On the nut 97, the cylindrical lens 92 is fixed. The rotation of the motor 98 causes the ball screw 96 to be rotated and thereby the cylindrical lens 92 fixed on the nut 97 is shifted linearly in the optical axis direction of the cylindrical lens 92. The motor 98 may be controlled by the computer 50.

Also by the light sheet microscope 5, the same advantages as those of the light sheet microscope 3 can be obtained. Further, the light sheet microscope 5 enables a condensing position relating to the width direction of the light sheet to be maintained at a constant position regardless of the settings.

<Sixth Embodiment>

Figure 8A:
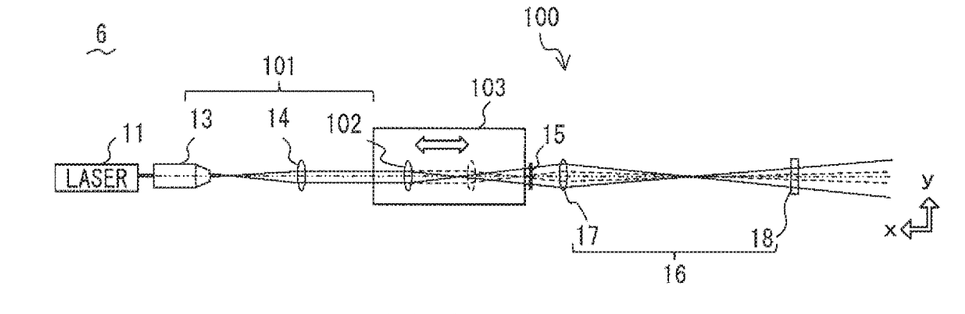
FIGS. 8A and 8B illustrate a configuration of a light sheet microscope 6 according to a sixth embodiment. Further, in FIG. 8A, a ray diagram relating to the width direction of the light sheet is depicted, and in FIG. 8B, a ray diagram relating to the thickness direction of the light sheet is depicted.
Figure 8B:
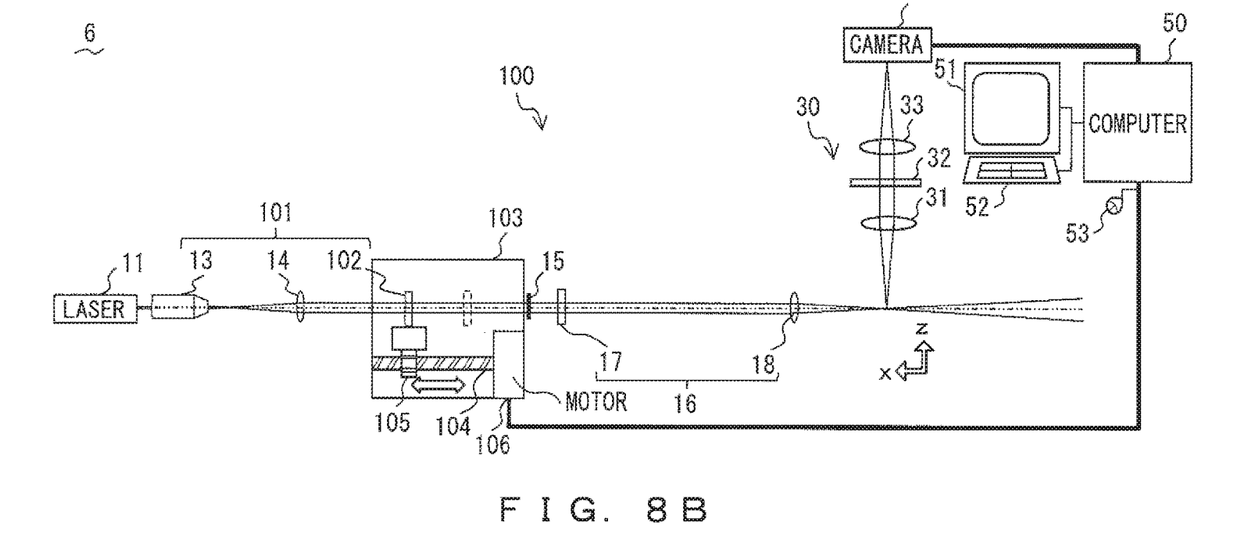

FIGS. 8A and 8B illustrate a configuration of a light sheet microscope 6 according to the present embodiment. In FIG. 8A and in FIG. 8B, a ray diagram relating to the width direction of a light sheet is depicted and a ray diagram relating to the thickness direction of the light sheet is depicted, respectively, along with the configuration of the light sheet microscope 6.

The light sheet microscope 6 differs from the light sheet microscope 3 in the configuration between the laser 11 and the scanner 15. The other configurations thereof are the same as those of the light sheet microscope 3. An illumination optical system 100 of the light sheet microscope 6 differs from the illumination optical system 70 of the light sheet microscope 3 in that a first optical system 101 is provided in place of the first optical system 71.

The first optical system 101 differs from the first optical system 71 in that the cylindrical lens 102 is provided in place of the cylindrical lens 72. The cylindrical lens 102 is a shifting lens that is arranged so as to be shifted in the optical axis direction through the structure to be hereinafter described, and is arranged so as to have the refractive power in the xy-plane and so as not to have the refractive power in the xz-plane.

The light sheet microscope 6 includes a lens unit 103 that houses the cylindrical lens 102. The lens unit 103 is a setting changer that changes a focal length of the first optical system 101 and thereby changes the setting of the divergence angle relating to the width direction of the light sheet emitted from the illumination optical system 100. As a structure in which the cylindrical lens 102 is shifted in the optical axis direction of the cylindrical lens 102, the lens unit 103 includes a ball screw 104, a nut 105 screwed to the ball screw 104, and a motor 106 that rotates the ball screw 104. On the nut 105, the cylindrical lens 102 is fixed. The rotation of the motor 106 causes the ball screw 104 to be rotated and thereby the cylindrical lens 102 fixed on the nut 105 is shifted linearly in the optical axis direction of the cylindrical lens 102. The motor 106 may be controlled by the computer 50.

Also by the light sheet microscope 6, the same advantages as those of the light sheet microscope 3 can be obtained.

<Seventh Embodiment>

Figure 9A:
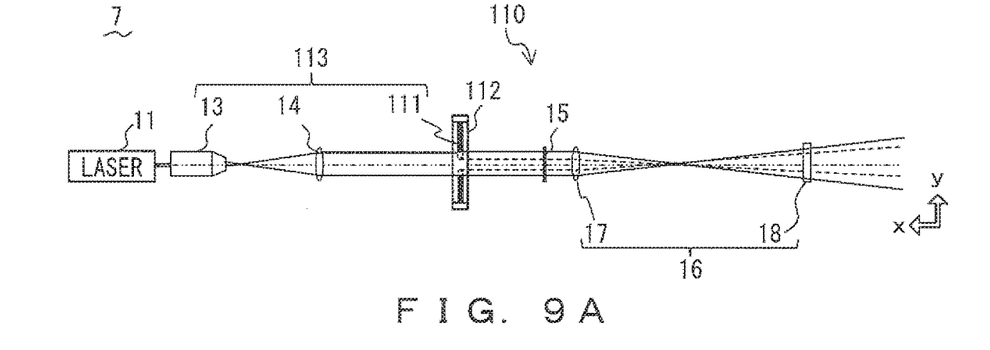
FIGS. 9A and 9B illustrate a configuration of a light sheet microscope 7 according to a seventh embodiment. Further, in FIG. 9A, a ray diagram relating to the width direction of the light sheet is depicted, and in FIG. 9B, a ray diagram relating to the thickness direction of the light sheet is depicted.
Figure 9B:
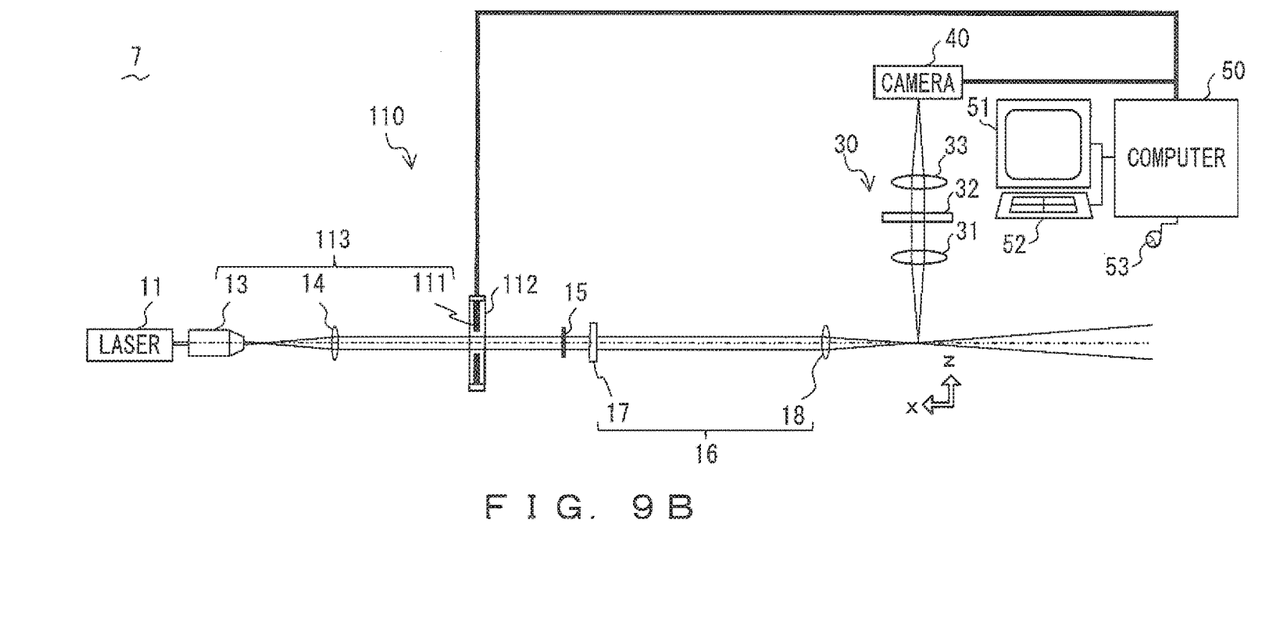

FIGS. 9A and 9B illustrate a configuration of a light sheet microscope 7 according to the present embodiment. In FIG. 9A and in FIG. 9B, a ray diagram relating to the width direction of a light sheet is depicted and a ray diagram relating to the thickness direction of the light sheet is depicted, respectively, along with the configuration of the light sheet microscope 7.

The light sheet microscope 7 differs from the light sheet microscope 3 in the configuration between the laser 11 and the scanner 15. The other configurations thereof are the same as those of the light sheet microscope 3. An illumination optical system 110 of the light sheet microscope 7 differs from the illumination optical system 70 of the light sheet microscope 3 in that a first optical system 113 is provided in place of the first optical system 71. The first optical system 113 includes a diaphragm 111 in addition to the lens 13 and the lens 14. The diaphragm 111 is an adjustable diaphragm capable of changing a diaphragm diameter that is arranged between the laser 11 and the scanner 15. The diaphragm 111 is preferably configured so that the diaphragm diameter is changed only in the width direction of the light sheet.

The light sheet microscope 7 further includes a diaphragm unit 112 that houses the diaphragm 111. The diaphragm unit 112 is a setting changer that changes the light flux diameter of light incident on the scanner 15 and thereby changes the setting of the divergence angle relating to the width direction of the light sheet emitted from the illumination optical system 110. In addition, the diaphragm unit 112 is a diaphragm diameter changer that changes the diaphragm diameter of the diaphragm 111. Further, the diaphragm unit 112 may be controlled by the computer 50.

Also by the light sheet microscope 7, the same advantages as those of the light sheet microscope 3 can be obtained. Further, the light sheet microscope 7 enables a condensing position relating to the width direction of the light sheet to be maintained at a constant position regardless of the settings.

<Eighth Embodiment>

Figure 10A:
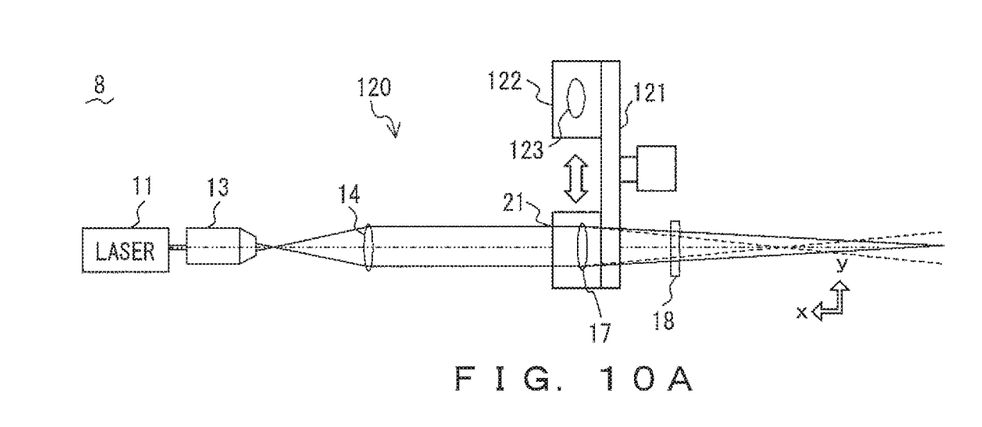
FIGS. 10A and 10B illustrate a configuration of a light sheet microscope 8 according to an eighth embodiment. Further, in FIG. 10A, a ray diagram relating to the width direction of the light sheet is depicted, and in FIG. 10B, a ray diagram relating to the thickness direction of the light sheet is depicted.
Figure 10B:
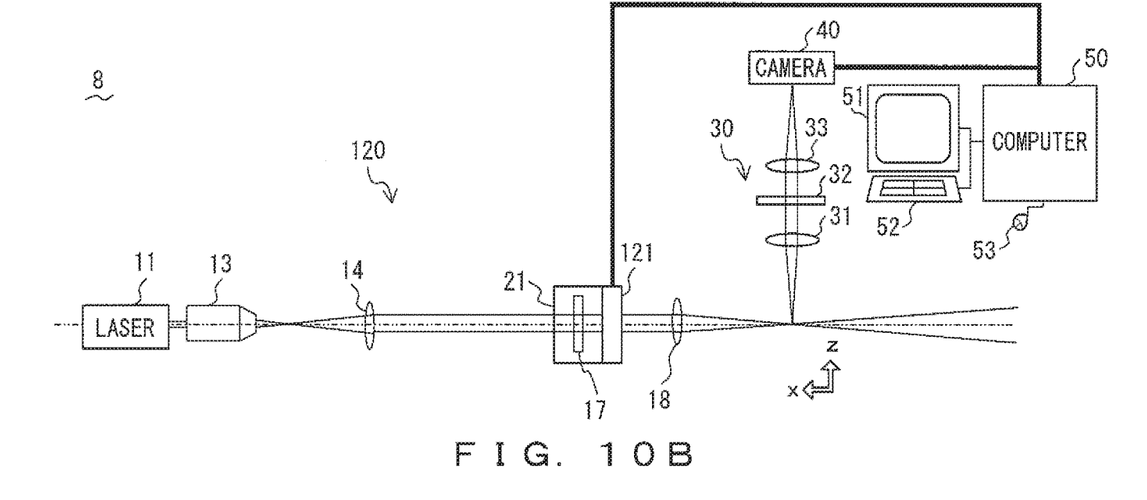

FIGS. 10A and 10B illustrate a configuration of a light sheet microscope 8 according to the present embodiment. In FIG. 10A and in FIG. 10B, a ray diagram relating to the width direction of a light sheet is depicted and a ray diagram relating to the thickness direction of the light sheet is depicted, respectively, along with the configuration of the light sheet microscope 8.

The light sheet microscope 8 differs from the light sheet microscope 1 in that an illumination optical system 120 is provided in place of the illumination optical system 10 and a setting change mechanism 121 is provided in place of the setting change mechanism 20. The illumination optical system 120 differs from the illumination optical system 10 in that the scanner 15 is not provided. The illumination optical system 120 forms the light sheet converged in the width direction as illustrated in FIG. 10A.

The setting change mechanism 121 is a setting changer of the convergence angle relating to the width direction of the light sheet emitted from the illumination optical system 120. Here, the convergence angle is a maximum angle formed by the optical axis on the emission side of the illumination optical system 10 and the beam components of the light sheet emitted from the illumination optical system 10. As the convergence angle is greater, light can sneak more into an area closer to a shading portion and the band of shadow can be more suppressed. The setting change mechanism 121 includes a lens exchanger that switches the lens unit arranged on the optical path from the lens unit 21 to the lens unit 122 and exchanges the cylindrical lens 17 for the cylindrical lens 123. The cylindrical lens 123 is arranged so as to have the refractive power in the xy-plane and so as not to have the refractive power in the xz-plane. The cylindrical lens 123 has a focal length different from that of the cylindrical lens 17.

The setting change mechanism 121 exchanges the lens units to change the focal length of the illumination optical system 120 and thereby changes an angle relating to the width direction of the light sheet toward the sample from the illumination optical system 120. Further, when the cylindrical lens 123 is arranged on the optical path, the illumination optical system 120 is composed of the lens 13, the lens 14, the cylindrical lens 123, and the cylindrical lens 18.

According to the light sheet microscope 8, the lens units are switched by the setting change mechanism 121 to thereby change the setting of the convergence angle of the light sheet in response to the sample. Therefore, the band of shadow can be suppressed regardless of the samples.

<Ninth Embodiment>

Figure 11A:
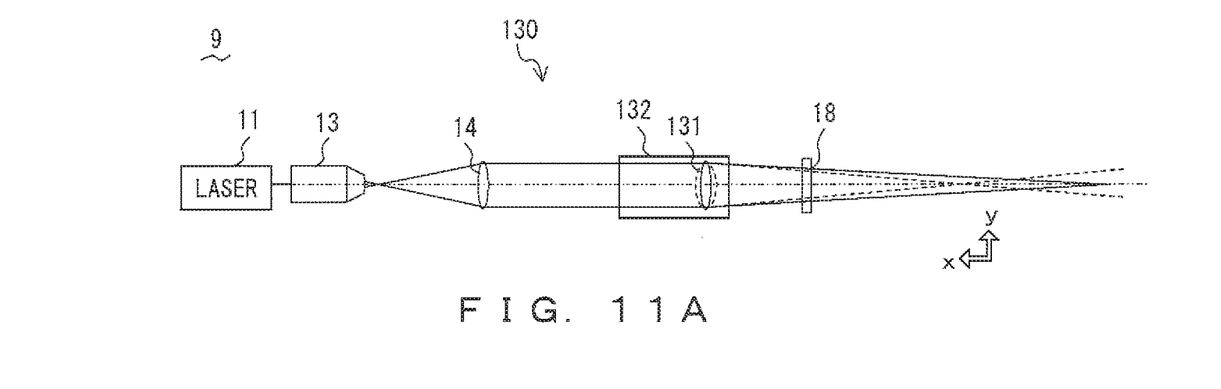
FIGS. 11A and 11B illustrate a configuration of a light sheet microscope 9 according to a ninth embodiment. Further, in FIG. 11A, a ray diagram relating to the width direction of the light sheet is depicted, and in FIG. 11B, a ray diagram relating to the thickness direction of the light sheet is depicted.
Figure 11B:
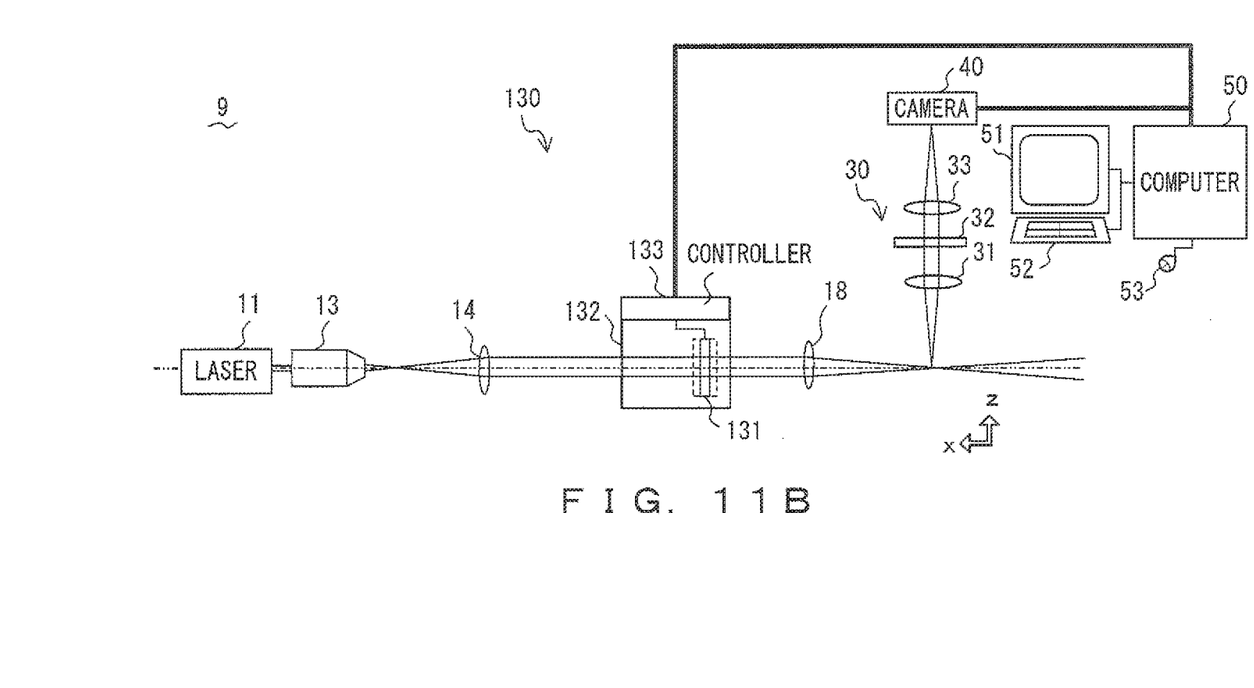

FIGS. 11A and 11B illustrate a configuration of a light sheet microscope 9 according to the present embodiment. In FIG. 11A and in FIG. 11B, a ray diagram relating to the width direction of a light sheet is depicted and a ray diagram relating to the thickness direction of the light sheet is depicted, respectively, along with the configuration of the light sheet microscope 9.

The light sheet microscope 9 differs from the light sheet microscope 8 in the configuration between the lens 14 and the cylindrical lens 18. An illumination optical system 130 of the light sheet microscope 9 differs from the illumination optical system 120 in that a cylindrical lens 131 is provided in place of the cylindrical lens 17. The cylindrical lens 131, which is arranged so as to have the variable refractive power in the xy-plane and so as not to have the refractive power in the xz-plane, is a varifocal lens representative of the liquid lens.

The light sheet microscope 9 includes a lens unit 132 that houses cylindrical lens 131. The lens unit 132 is a setting changer that changes a focal length of the illumination optical system 130 and thereby changes the setting of the convergence angle relating to the width direction of the light sheet emitted from the illumination optical system 130. The lens unit 132 includes a controller 133 that is a focal length changer that changes a focal length of the cylindrical lens 131. The controller 133 can change a focal length of the lens unit 132 at high speed. Further, the controller 133 may be controlled by the computer 50

Also by the light sheet microscope 9, the same advantages as those of the light sheet microscope 8 can be obtained. In the light sheet microscope 9, the focal length of the illumination optical system 130 can be further changed at high speed by the change in the focal length of the varifocal lens. Therefore, according to the light sheet microscope 9, the setting of the convergence angle of the light sheet can be changed faster than the light sheet microscope 8.

In each of the above-described embodiments, specific examples are shown to facilitate an understanding of the present invention, and the present invention is not limited to the embodiments. In the light sheet microscope and the sheet illumination method, various modifications and changes may be made within a range of the present invention defined by the scope of claims. Some characteristics may be combined to a single embodiment in a context of an individual embodiment described in this specification. For example, the cylindrical lens 18 arranged in front of the sample may be provided in a container for containing samples, or the container itself may include the cylindrical lens 18. Further, in FIGS. 1A and 1B, and FIGS. 4A and 4B to FIGS. 9A and 9B, an example is illustrated in which the light sheet irradiated onto the sample is a divergent light flux in the width direction; however, a state in the width direction of the light sheet is not limited to a divergent state, and further the state may be a convergent state due to a change in the focal length in the width direction of the scanning optical system.

What is claimed is:

1. A light sheet microscope comprising:
    a detection optical system configured to detect light from a sample;
    an illumination optical system configured to irradiate a light sheet onto the sample from a direction substantially perpendicular to an optical axis of the detection optical system, the light sheet having a cross section that is long in one direction and short in another direction within a plane perpendicular to an optical axis of the illumination optical system, and the light sheet having a divergence angle or convergence angle relating to a width direction that is the direction in which the cross section is long; and
    a setting changer configured to change a setting of the divergence angle or convergence angle.

2. The light sheet microscope according to claim 1, wherein the illumination optical system includes:
    a scanner configured to deflect the light sheet in the width direction; and
    a scanning optical system that is arranged between the scanner and the sample so that a front side focal point position of the scanning optical system coincides with the scanner, the scanning optical system being configured to convert light deflected by the scanner into the light sheet to scan the sample.

3. The light sheet microscope according to claim 2, wherein the setting changer is configured to change a focal length of the scanning optical system.

4. The light sheet microscope according to claim 3, wherein:
    the scanning optical system includes a varifocal lens, and
    the setting changer includes:
        a focal length changer configured to change a focal length of the varifocal lens; and
        a shifter configured to shift the varifocal lens in an optical axis direction.

5. The light sheet microscope according to claim 3, wherein the setting changer includes a lens exchanger that is configured to exchange a first lens included in the scanning optical system for a second lens having a focal length different from a focal length of the first lens and to arrange the second lens so that the scanner is positioned at a front side focal point position of the second lens.

6. The light sheet microscope according to claim 2, wherein the setting changer is configured to change a light flux diameter of light incident on the scanner.

7. The light sheet microscope according to claim 6, further comprising:
    a light source configured to emit light that is converted to the light sheet; and
    a first optical system that is arranged between the light source and the scanner and is configured to irradiate light from the light source onto the scanner,
    wherein the setting changer is configured to change a focal length of the first optical system.

8. The light sheet microscope according to claim 7, wherein:
    the first optical system includes a varifocal lens, and
    the setting changer includes a focal length changer that is configured to change a focal length of the varifocal lens.

9. The light sheet microscope according to claim 7, wherein:
    the first optical system includes a variable magnification optical system, and
    the setting changer includes a magnification changer that is configured to change a magnification of the variable magnification optical system.

10. The light sheet microscope according to claim 7, wherein the setting changer includes a lens exchanger that is configured to exchange a first lens included in the first optical system for a second lens having a focal length different from a focal length of the first lens.

11. The light sheet microscope according to claim 7, wherein:
    the first optical system includes a shifting lens that is arranged shiftably in an optical axis direction, and the setting changer includes a shifter that is configured to shift the shifting lens in the optical axis direction.

12. The light sheet microscope according to claim 6, further comprising:
 a light source configured to emit light that is converted to the light sheet; and
 a diaphragm that is arranged between the light source and the scanner,
 wherein the setting changer includes a diaphragm diameter changer that is configured to change a diaphragm diameter of the diaphragm.

13. The light sheet microscope according to claim 1, wherein the setting changer is configured to change a focal length of the illumination optical system.

14. The light sheet microscope according to claim 13, wherein:
 the illumination optical system includes a varifocal lens, and
 the setting changer includes a focal length changer that is configured to change a focal length of the varifocal lens.

15. The light sheet microscope according to claim 13, wherein the setting changer includes a lens exchanger that is configured to exchange a first lens included in the illumination optical system for a second lens having a focal length different from a focal length of the first lens.

16. A sheet illumination method for a light sheet microscope that includes a detection optical system and an illumination optical system, the sheet illumination method being for illuminating a sample by a light sheet having a cross section that is long in one direction and short in another direction within a plane perpendicular to an optical axis of the illumination optical system, the sheet illumination method comprising:
 changing a setting of a divergence angle or convergence angle relating to a width direction of the light sheet, the width direction being the direction in which the cross section is long; and
 irradiating the light sheet onto the sample from a direction substantially perpendicular to an optical axis of the detection optical system.

* * * * *